US009988219B2

(12) United States Patent
Clark et al.

(10) Patent No.: US 9,988,219 B2
(45) Date of Patent: Jun. 5, 2018

(54) METAL CONTAINER CONVEYOR SYSTEMS INCLUDING DIVERTER MECHANISMS, AND METAL CONTAINER PROCESSING SYSTEMS INCLUDING THE SAME

(71) Applicant: Heraeus Noblelight America LLC, Gaithersburg, MD (US)

(72) Inventors: John W. Clark, Littleton, CO (US); Travis Peter Steinmetz, New Market, MD (US); Pradyumna Kumar Swain, North Potomac, MD (US)

(73) Assignee: Heraeus Noblelight America LLC, Gaithersburg, MD (US)

( * ) Notice: Subject to any disclaimer, the term of this patent is extended or adjusted under 35 U.S.C. 154(b) by 0 days. days.

(21) Appl. No.: 15/477,734

(22) Filed: Apr. 3, 2017

(65) Prior Publication Data

US 2017/0283186 A1 Oct. 5, 2017

Related U.S. Application Data

(60) Provisional application No. 62/318,422, filed on Apr. 5, 2016.

(51) Int. Cl.
*B65G 47/82* (2006.01)
*B65G 47/95* (2006.01)
*B65G 47/76* (2006.01)
*B65G 21/20* (2006.01)
*B65G 47/00* (2006.01)

(52) U.S. Cl.
CPC ....... *B65G 47/766* (2013.01); *B65G 21/2072* (2013.01); *B65G 47/82* (2013.01); *B65G 47/00* (2013.01); *B65G 47/76* (2013.01); *B65G 47/95* (2013.01)

(58) Field of Classification Search
CPC ...... B65G 47/766; B65G 47/82; B65G 47/00; B65G 47/76; B65G 47/95; B65G 21/2045; B65G 21/2063; B65G 21/2072; B65G 47/688
See application file for complete search history.

(56) References Cited

U.S. PATENT DOCUMENTS

| | | | | |
|---|---|---|---|---|
| 5,423,409 A * | 6/1995 | Wipf | ...................... | B65B 23/12 198/367 |
| 5,655,643 A * | 8/1997 | Bonnet | ................ | B65G 47/766 198/370.08 |
| 5,787,679 A * | 8/1998 | Lynch | .................. | B65G 47/766 198/367 |
| 5,988,356 A * | 11/1999 | Bonnet | ................ | B65G 47/766 198/369.5 |
| 6,168,005 B1 * | 1/2001 | Petrovic | ............. | B65G 47/5118 198/347.4 |
| 6,722,872 B1 * | 4/2004 | Swanson | ................. | B29C 41/36 425/225 |
| 7,506,745 B1 * | 3/2009 | McGuire | ................ | B65G 15/14 198/370.1 |

(Continued)

*Primary Examiner* — Mark A Deuble
(74) *Attorney, Agent, or Firm* — Stradley Ronon Stevens & Young, LLP

(57) ABSTRACT

A metal container conveyor system is provided. The metal container conveyor system includes (i) a conveyor body for moving metal containers, and (ii) at least one diverter mechanism configured to change a width of a portion of the conveyor body.

12 Claims, 5 Drawing Sheets

(56) References Cited

U.S. PATENT DOCUMENTS

| | | | |
|---|---|---|---|
| 2004/0129530 A1* | 7/2004 | Prakken | B65G 47/715 198/367 |
| 2009/0000914 A1* | 1/2009 | Bonhomme | B65G 21/2072 198/457.01 |
| 2017/0107063 A1* | 4/2017 | Beesley | B65G 47/5131 |

* cited by examiner

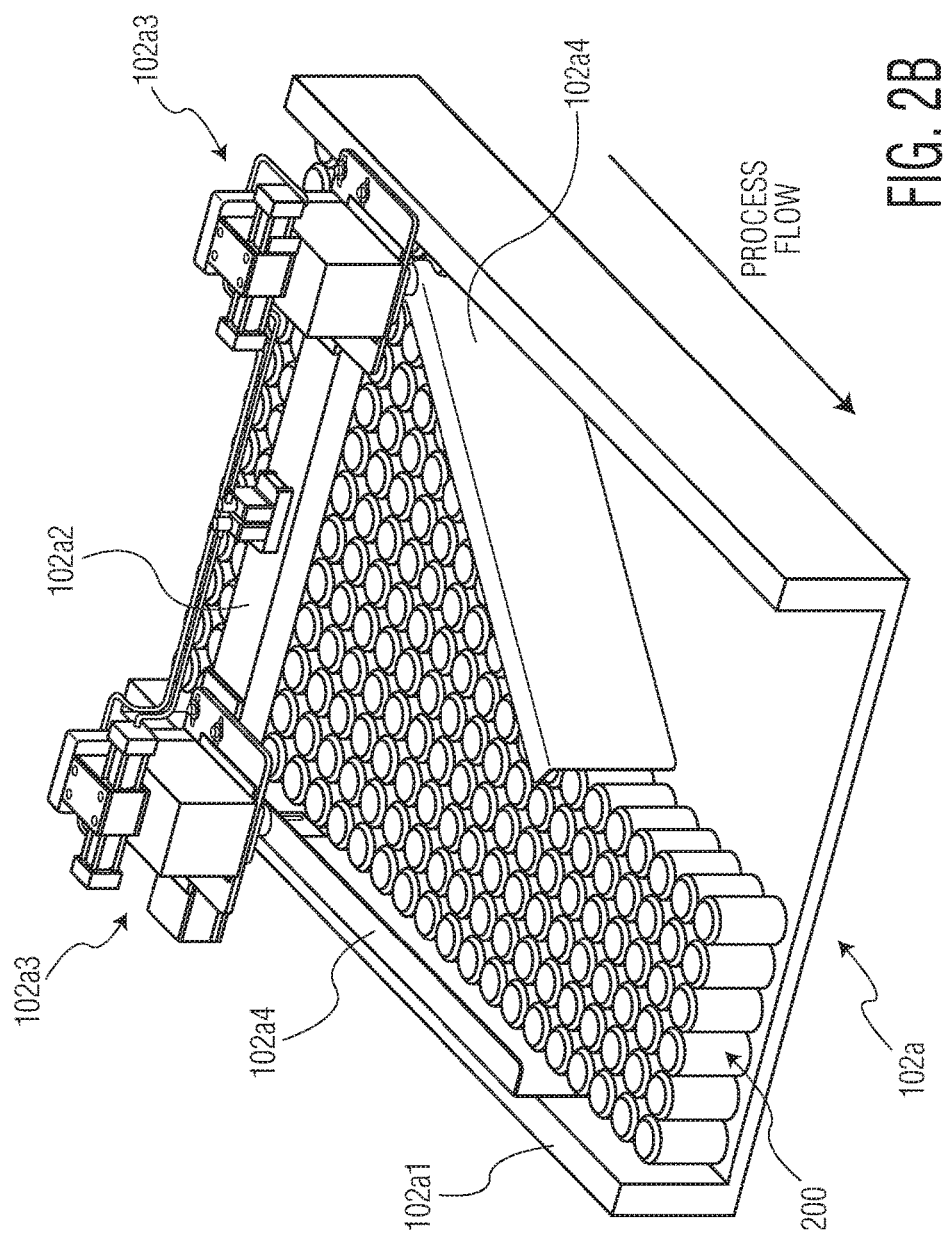

METAL CONTAINER CONVEYOR SYSTEMS INCLUDING DIVERTER MECHANISMS, AND METAL CONTAINER PROCESSING SYSTEMS INCLUDING THE SAME

CROSS-REFERENCE TO RELATED APPLICATION

This application claims the benefit of U.S. Provisional Patent Application No. 62/318,422, filed Apr. 5, 2016, the content of which is incorporated herein by reference.

FIELD

The invention relates to conveyor systems for metal containers, and more particularly, to conveyor systems (and related processing systems) for beverage cans (and other metal containers) including diverter systems.

BACKGROUND

In connection with certain metal containers (e.g., foodstuff containers such as food cans, fluid containers such as beer cans or soda cans, etc.), coatings are often applied to a surface of the containers (e.g., a bottom surface, and/or other surface, of the containers). For example, such a coating may be applied to a bottom surface of the containers to prevent the metal containers from sticking to a surface, tipping over, falling, rusting, etc. during manufacture (or other processing) of the metal containers. In specific applications (e.g., including steel or aluminum cans), the coating is applied to prevent the formation of rust (from developing on steel cans), or to prevent the formation of aluminum oxide on the conveyor surfaces during can manufacturing.

Such coating systems may include a coating application system for applying the coating (e.g., a roller system for applying the coating, a sprayer system for applying the coating, or other coating application systems), and an ultraviolet (UV) curing system for curing the coating after application by the coating application system. Unfortunately, the UV curing systems sometimes experience failures or other operational problems requiring maintenance, thereby shutting down the conveyor system.

Thus, it would be desirable to provide improved metal container conveyor systems and metal container processing systems.

SUMMARY

According to an exemplary embodiment of the invention, a metal container conveyor system is provided. The metal container conveyor system includes (i) a conveyor body for moving metal containers, and (ii) at least one diverter mechanism configured to change a width of a portion of the conveyor body.

According to another exemplary embodiment of the invention, a metal container processing system is provided. The metal container conveyor system includes (a) a conveyor body for moving metal containers, and (b) at least one diverter mechanism configured to change a width of a portion of the conveyor body. The metal container conveyor system includes a coating applicator system, downstream of the metal container conveyor system, for applying a coating to a portion of each of the metal containers. The metal container conveyor system also includes an ultraviolet (UV) curing system (including UV lamps), downstream of the coating applicator system, for curing the coating applied to each of the metal containers at the coating applicator system.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures:

FIG. 2B is a perspective view of the conveyor system of FIG. 2A with one of the diverter arms in an extended position;

DETAILED DESCRIPTION

In accordance with certain exemplary embodiments of the invention, in the can making industry (e.g., aluminum beverage cans), it is desirable to increase efficiency and reduce production down time. To this end, systems and methods of diverting cans in the event of an ultraviolet (UV) system fault are provided.

Exemplary technical objects of the coating applicator systems, and corresponding UV curing systems, is to increase can mobility and/or eliminate rust by applying a UV curable coating on the bottom of the can. When there is a UV curing system fault there is a significant potential to back up the production line, thus causing expensive production losses because of the line being down. Aspects of the invention provide a mechanism to keep the system running until repairs can be made to the UV curing system.

Aspects of the invention provide systems and methods of detecting a UV system fault, and diverting cans away from a portion of the UV bottom coating conveyor where the faulty UV lamps are located. A mechanical shutter system, or other diverter mechanisms, may be used to divert the cans, as desired. The diverter mechanisms may be actuated and controlled by various means, for example, electrical control, pneumatic control, etc.

The diverter mechanisms may be of various designs tailored to conveyor size and production throughput requirements. The diverted cans can continue through the production process until the UV lamp fault can be repaired. The invention can be tied into conveyor line control in order to slow down or speed up the can conveyors. The invention may provide a mechanism for keeping the can production line running after a UV bottom coating UV curing lamp fault is detected, thus reducing/eliminating line down time due to a UV system fault.

Figure 1:
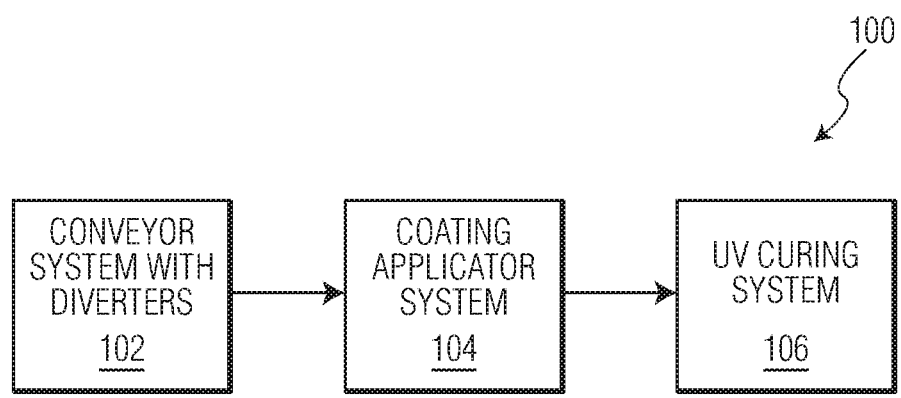
FIG. 1 is a block diagram of a metal container processing system including a conveyor system, a coating applicator system, and an ultraviolet (UV) curing system in accordance with an exemplary embodiment of the invention.

FIG. 1 illustrates a metal container processing system 100. Metal container processing system 100 includes a conveyor system 102 (with at least one diverter), a coating applicator system 104 (e.g., a roller based applicator system for rolling the coating onto a bottom surface of aluminum cans, a spray applicator system, etc.), and a UV curing system 106 for curing the coating applied by the coating applicator system 104.

Figure 2A:
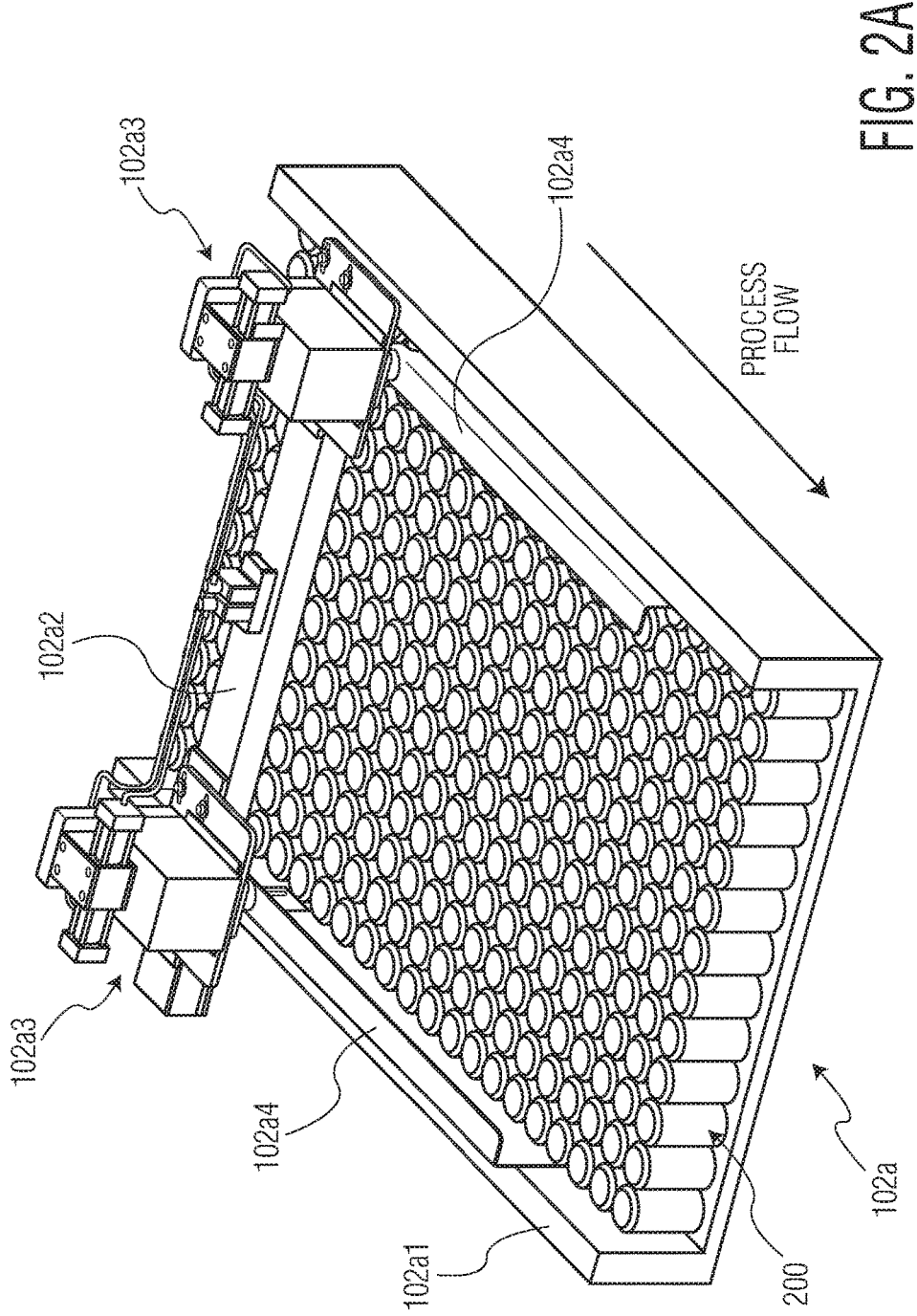
FIG. 2A is a perspective view of a conveyor system including diverter arms in a retracted position in accordance with an exemplary embodiment of the invention.
Figure 3A:
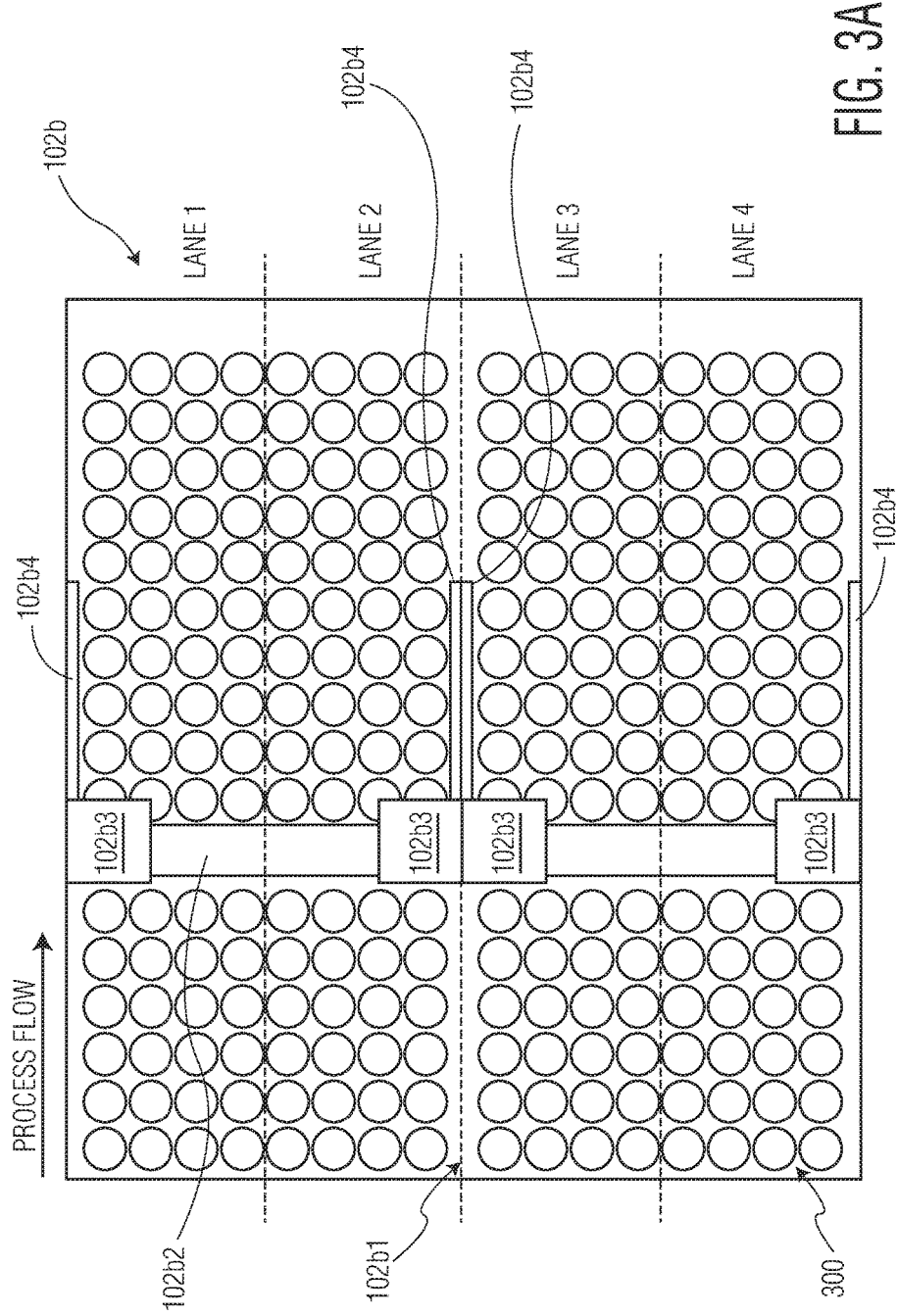
FIG. 3A is a perspective view of another conveyor system including diverter arms in a retracted position in accordance with an exemplary embodiment of the invention.
Figure 3B:
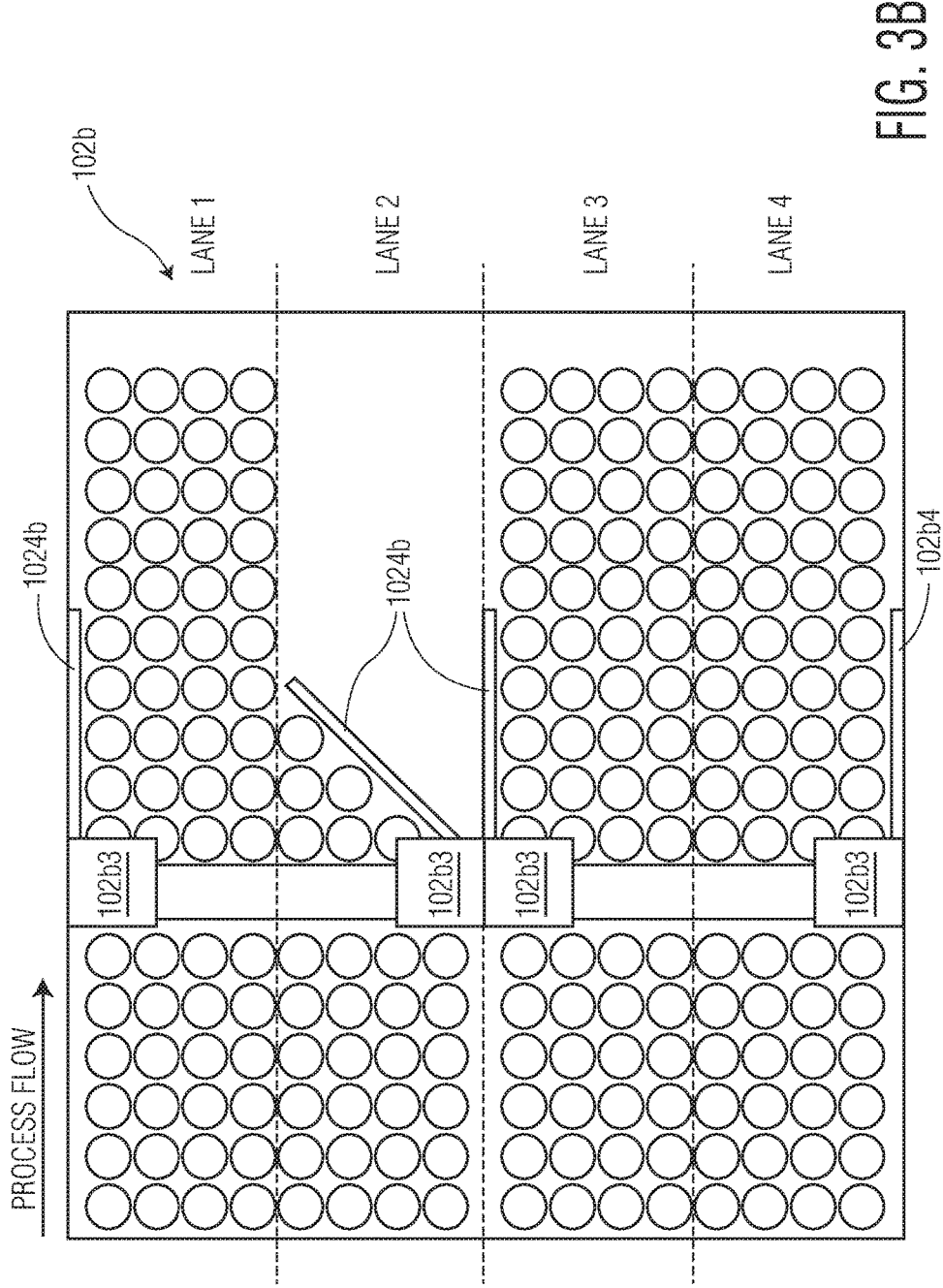
FIG. 3B is a perspective view of the conveyor system of FIG. 3A with one of the diverter arms in an extended position.

FIGS. 2A-2B illustrate a first example of conveyor system 102 (i.e., conveyor system 102a), while FIGS. 3A-3B illustrate a second example of conveyor system 102 (i.e., conveyor system 102b). Of course, alternative systems, having any desired number of diverter mechanisms, in any desired configuration, are contemplated.

Referring specifically to FIG. 2A, conveyor system 102a includes a conveyor body 102a1 and a diverter support structure 102a2 extending across a width of conveyor body 102a1. Cans 200 travel in the direction of the "Process Flow" toward a coating applicator (e.g., coating applicator system 104 shown in FIG. 1) and a UV curing system (e.g., UV curing system 106 shown in FIG. 1). In the example shown in FIG. 2A, diverter support structure 102a2 supports two diverter mechanisms 102a4 (i.e., diverter arms 102a4). Each diverter arm 102a4 is operated by a motion system 102a3 (e.g., an electrically controlled motion system, a pneumatically controlled motion system, etc.). Each of the diverter arms 102a4 is configured to restrict flow of the metal containers across 50% of a width of conveyor body 102a when the diverter arm 102a4 is operated in an extended position.

In the event that a portion of the downstream UV curing system (e.g., UV curing system 106 shown in FIG. 1) is not operational—it may be desirable to adjust the active width of conveyor system 102a. That is, the width may be adjusted such that the cans that proceed to the coating applicator and the UV curing system may all be processed by the operational portion of the UV curing mechanism. For example, if only a portion of a width of the coating applicator system 104 or the UV curing system 106 is available for processing (because of a fault of a portion of coating applicator system 104 or UV curing system 106), the active width of conveyor system 102a may be adjusted accordingly.

FIG. 2B illustrates one of the diverter arms 102a4 extended (using its motion system 102a3) to adjust the width of conveyor system 102a to have a reduced width such that the cans 200 that proceed to the coating applicator and the UV curing system may all be processed properly. That is, a fault of a portion of coating applicator system 104 or the UV curing system 106 has been detected (e.g., by a sensor in communication with a processor), and then the processor controls conveyor system 102a to adjust the active width of conveyor system 102a.

Referring specifically to FIG. 3A, conveyor system 102b includes a conveyor body 102b1 and a diverter support structure 102b2 extending across a width of conveyor body 102b1. Cans 300 travel in the direction of the "Process Flow" toward a coating applicator (e.g., coating applicator system 104 shown in FIG. 1) and a UV curing system (e.g., UV curing system 106 shown in FIG. 1). In the example shown in FIG. 3A, diverter support structure 102b2 supports four diverter mechanisms 102b4 (i.e., diverter arms 102b4). Each diverter arm 102b4 is operated by a motion system 102b3 (e.g., an electrically controlled motion system, a pneumatically controlled motion system, etc.). Each of the diverter arms 102b4 is configured to restrict flow of the metal containers across 25% of a width of conveyor body 102b when the diverter arm 102b4 is operated in an extended position.

In an exemplary UV curing system having 4 UV curing modules extending across a width of the UV curing system, it may be desirable to provide 4 "lanes" at the conveyor system that may be controlled using diverter arms 102b4. More specifically, in the event that one (or more) of the UV curing modules is not operational (or a portion of coating applicator system is not operational), corresponding portions of the width of conveyor system 102b may be "blocked" using the corresponding diverter mechanisms. FIG. 3A illustrates four (4) such lanes, each controlled using a respective one of the diverter arms 102b4. In FIG. 3A, all four diverter arms 102b4 are in a retracted position, such that all four lanes are open.

Imagine now that a portion of the UV curing system corresponding to Lane 2 in FIG. 3A is not operational. This is the configuration shown in FIG. 3B, where a motion system 102b3 is used to move the corresponding diverter arm 102b4 to an extended position (as shown in FIG. 3B) to adjust a width of conveyor system 102b, thereby blocking flow of cans 300 to Lane 2 (and the corresponding portion of the UV curing module).

Although the diverter mechanisms (e.g., diverter arms) may take any of a number of forms, a mechanical can diverting gate/arm may be provided that pivots (e.g., on a cylinder), thereby blocking off a section of conveyor where the UV lamps of the UV curing system have faulted.

Fault of the UV lamps of the UV curing system may be automatically detected (e.g., using sensors at the UV curing system), whereby such faults may be communicated to a processor that controls the diverter mechanisms. As used herein, the terms "processor" shall be broadly construed to refer to any device including a processing unit (e.g., a central processing unit) or other hardware that executes computer program instructions. Examples of "processors" include microprocessors, microcontrollers, digital signal processors (DSPs), programmable logic controllers (PLCs), computers, etc.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A metal container processing system comprising:
    a metal container conveyor system including (a) a conveyor body for moving metal containers, and (b) at least one diverter mechanism configured to change a width of a portion of the conveyor body;
    a coating applicator system, downstream of the metal container conveyor system, for applying a coating to a portion of each of the metal containers; and
    a UV curing system, downstream of the coating applicator system, for curing the coating applied to each of the metal containers at the coating applicator system.

2. The metal container processing system of claim 1 wherein the metal containers include beverage cans.

3. The metal container processing system of claim 1 wherein the metal containers include food cans.

4. The metal container processing system of claim 1 wherein the at least one diverter mechanism includes a plurality of diverter arms.

5. The metal container processing system of claim 4 further comprising at least one motion system for operating the plurality of diverter arms.

6. The metal container processing system of claim 5 wherein the at least one motion system includes at least one of an electrically controlled motion system or a pneumatically controlled motion system.

7. The metal container processing system of claim 1 further comprising a support structure extending across a width of the conveyor body, the support structure supporting the at least one diverter mechanism.

8. The metal container processing system of claim 1 wherein the at least one diverter mechanism is configured to operate based on an operational status of a UV curing system configured to cure a coating applied to the metal containers.

9. The metal container processing system of claim 1 further comprising a computer configured to control the at least one diverter mechanism.

10. The metal container processing system of claim 1 wherein the at least one diverter mechanism includes two diverter arms, each of the diverter arms is configured to restrict flow of the metal containers across 50% of a width of the conveyor body when the diverter arm is operated in an extended position.

11. The metal container processing system of claim 1 wherein the at least one diverter mechanism includes four diverter arms, each of the diverter arms is configured to restrict flow of the metal containers across 25% of a width of the conveyor body when the diverter arm is operated in an extended position.

12. The metal container processing system of claim 1 wherein the at least one diverter mechanism includes a plurality of diverter arms, each of the diverter arms being configured for pivotal operation.

\* \* \* \* \*